J. B. LYONS.
Drying Peat.

No. 100,301. Patented March 1, 1870.

Witnesses.
Chas. H. Poole
J. B. Woodruff

Inventor.
James B. Lyons

United States Patent Office.

JAMES B. LYONS, OF MILTON, CONNECTICUT.

Letters Patent No. 100,301, dated March 1, 1870.

IMPROVEMENT IN FLOORS FOR DRYING PEAT.

The Schedule referred to in these Letters Patent and making part of the same.

*To all whom it may concern:*

Be it known that I, JAMES B. LYONS, of Milton, in the county of Litchfield, and State of Connecticut, have invented certain new and useful Improvements in Floors for Drying Peat; and the following is a full, clear, and exact description of the same, reference being had to the accompanying drawings making a part of this specification, in which—

Figure 1:
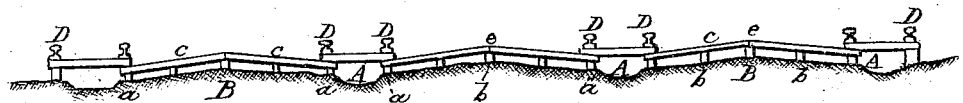
Figure 1 represents a sectional view of my improvement in floors for drying peat.
Figure 2:
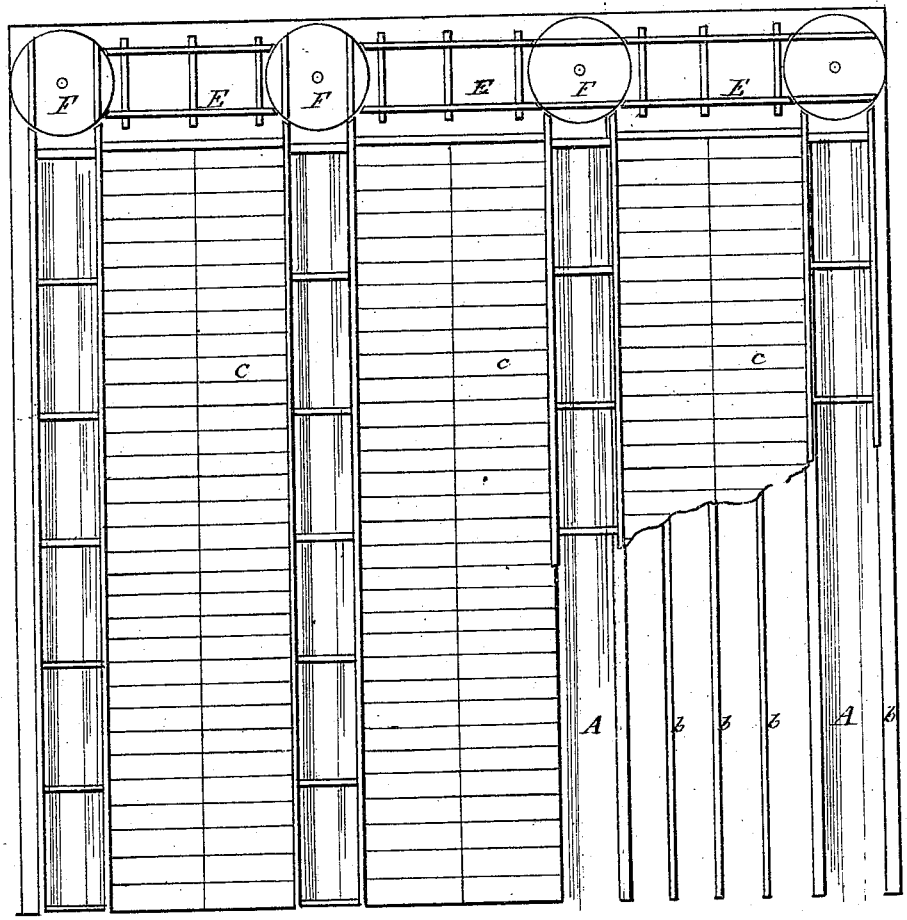
Figure 2 shows a plan or top view of the drying-floor with the tram-roads and turn-tables.

The object of my invention is to save manual labor and time, and to reduce the cost of manufacturing peat fuel.

My invention consists in the construction and arrangement of a series of floors and tram-roads, provided with turn-tables, for conveying peat trucks between the series of floors for depositing the ground peat, as it comes from the mill, for draining and drying.

To enable others to make and use my improvements, I will describe them more fully, referring to the drawings and the letters of reference marked thereon.

In constructing my improved yard or floors for draining and drying peat, I first prepare the ground by removing the earth at suitable intervals, A A A, and throwing it up between the parallels, so as to raise the central portion B B B ten or twelve inches higher than the edges *a a*, bordering on the sunken spaces or intervals A A, which are made twenty-four feet, more or less, apart, according to the size of the yard.

The ground being graded and prepared as above described, I place the parallel timbers *b b b*, on which the floors *c c c* are supported, so that the center, *e*, is ten inches higher than the edges, so that the water or moisture that may escape from the peat will drain off.

Over each of the sunken spaces A, I place a track or tram-rails, D D, for the truck-cars to run on to convey the ground peat to all parts of the drying-floor, where it is spread to the thickness of nine inches, more or less.

After the floors are covered with the ground peat, it is then marked off at right angles into suitable-sized blocks, the inclination of the floor C C being such that the rain that may fall upon it while being spread in the process of drying will not be absorbed by the peat, but will drain off into the gutters A A.

Any number of the series of floors may be arranged parallel to each other, and extended to any desired length, with the track of tram-rails between the series, and they may be provided with cross-sections of rails, E E, and turn-tables F F, so that a truck-car can be moved to any part of the floor or yard to carry the ground peat to be spread for drying, and also for conveying off the blocks of dry peat, and clearing the floors and yard.

The advantages of preparing a yard with elevated plank drying-floors and drains are very great. The floors being elevated four or six inches above the ground on the timbers, leaving parallel spaces under the floors for the free circulation of air, the peat will dry in less than one-fourth of the time that it will when spread on the ground, and is of a uniform and better quality. The blocks are more solid, and will be perfectly free from earth, sand, or other extraneous matter.

What I claim as my invention, and desire to secure by Letters Patent, is—

An improved structure to be employed in the drying of peat, consisting of the inclined floors C upon supports *b b*, and provided with tram-ways D E, turntables F, and sub-drains A, all constructed and arranged as herein shown and described.

JAMES B. LYONS.

Witnesses:
CHAS. H. POOLE,
J. B. WOODRUFF.